(12) United States Patent
Tallet et al.

(10) Patent No.: US 8,175,009 B2
(45) Date of Patent: *May 8, 2012

(54) SYSTEM AND METHOD FOR GENERATING SYMMETRICAL SPANNING TREES

(75) Inventors: Francois Edouard Tallet, Santa Clara, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/633,755

(22) Filed: Dec. 8, 2009

(65) Prior Publication Data

US 2010/0085899 A1    Apr. 8, 2010

Related U.S. Application Data

(63) Continuation of application No. 11/228,162, filed on Sep. 16, 2005, now Pat. No. 7,646,733.

(51) Int. Cl.
*H04L 12/28* (2006.01)
*H04L 12/56* (2006.01)
*G06F 15/177* (2006.01)

(52) U.S. Cl. ......... 370/256; 370/254; 370/402; 709/220

(58) Field of Classification Search .......... 370/216–256, 370/392–395, 401–414; 709/220–222, 238–241
See application file for complete search history.

(56) References Cited

U.S. PATENT DOCUMENTS

| | | | |
|---|---|---|---|
| 6,032,194 A | 2/2000 | Gai et al. | |
| 6,188,694 B1 * | 2/2001 | Fine et al. | 370/402 |
| 6,188,964 B1 | 2/2001 | Reister et al. | |
| 6,202,114 B1 | 3/2001 | Dutt et al. | |
| 6,219,739 B1 * | 4/2001 | Dutt et al. | 710/311 |
| 6,388,995 B1 | 5/2002 | Gai et al. | |
| 6,515,969 B1 | 2/2003 | Smith | |
| 6,628,624 B1 | 9/2003 | Mahajan et al. | |
| 6,678,241 B1 * | 1/2004 | Gai et al. | 370/216 |
| 6,801,506 B1 | 10/2004 | Dey | |
| 6,813,250 B1 | 11/2004 | Fine et al. | |
| 6,898,189 B1 | 5/2005 | Di Benedetto et al. | |
| 6,934,262 B1 | 8/2005 | Lau et al. | |
| 6,937,576 B1 | 8/2005 | Di Benedetto et al. | |

(Continued)

OTHER PUBLICATIONS

Perlman, R. et al., [rbridge] How Many Spanning Trees?, (internet newsgroup posting), (http://www.postel.org/pipermail/rbridge/2005-June/000352.html), Jun. 28, 2005, pp. 1-3.

(Continued)

*Primary Examiner* — Man Phan
(74) *Attorney, Agent, or Firm* — Cesari and McKenna, LLP

(57) ABSTRACT

In one embodiment, a network device receives on a first port a first spanning tree protocol (STP) control message including a first path-tracking field corresponding to a given spanning tree instance in a network. The first path-tracking field includes a value based on one or more other network devices that have propagated the first STP control message. The network device receives on a second port a second STP control message including a second path-tracking field corresponding to the given spanning tree instance. The second path-tracking field includes a value based on one or more other network devices that have propagated the second STP control message. The network device utilizes the values from the first path-tracking field and the second path-tracking field to select a root port for the given spanning tree instance.

20 Claims, 6 Drawing Sheets

U.S. PATENT DOCUMENTS

| | | |
|---|---|---|
| 6,944,130 B1 | 9/2005 | Chu et al. |
| 6,985,449 B2 * | 1/2006 | Higashiyama ............... 370/256 |
| 7,027,453 B2 | 4/2006 | Lui et al. |
| 7,127,523 B2 | 10/2006 | Kotser |
| 7,177,946 B1 * | 2/2007 | Kaluve et al. ............... 709/242 |
| 7,324,461 B2 | 1/2008 | Rouyer et al. |
| 7,428,237 B1 * | 9/2008 | Gai et al. ............... 370/395.53 |
| 2002/0159398 A1 | 10/2002 | Yamada et al. |
| 2004/0047300 A1 | 3/2004 | Enomoto et al. |
| 2004/0105455 A1 | 6/2004 | Seaman |
| 2005/0013260 A1 | 1/2005 | Ramanathan et al. |
| 2005/0149625 A1 | 7/2005 | Rouyer et al. |
| 2005/0259597 A1 * | 11/2005 | Benedetto et al. ........... 370/254 |
| 2006/0182133 A1 | 8/2006 | Choumaru et al. |
| 2006/0245376 A1 | 11/2006 | Ge et al. |
| 2007/0025275 A1 * | 2/2007 | Tallet et al. ............... 370/255 |
| 2007/0047472 A1 | 3/2007 | Florit et al. |
| 2007/0058571 A1 * | 3/2007 | Rose ............... 370/256 |
| 2007/0064628 A1 | 3/2007 | Tallet et al. |
| 2007/0121672 A1 * | 5/2007 | Kang ............... 370/466 |
| 2007/0258390 A1 * | 11/2007 | Khan et al. ............... 370/256 |

OTHER PUBLICATIONS

Seaman, Mick, Multiple Symmetric Spanning Trees, Revision 0.3, Mar. 9, 2005, pp. 1-4.

Internetworking Technologies Handbook No. 1-58705-001-3, Chapter 23 entitled Transparent Bridging, Cisco Press, pp. 23-1 through 23-8.

Virtual Bridged Local Area Networks; IEEE Std 802.1Q, 2003 Edition, IEEE, pp. 183-184 and 209.

Media Access Control (MAC) Bridges, ANSI/IEEE Std 802.1 D, 1998 Edition, IEEE, pp. 111.

U.S. Appl. No. 11/182,564, entitled Methods and Devices for Improving the Multiple Spanning Tree Protocol, by Normal Finn, on Jul. 14, 2005.

"Notification of Transmittal of the International Search Report and the Written Opinion of the International Searching Authority, or the Declaration," International Filing Date: Sep. 11, 2006, International Application No. PCT/US2006/35294, Applicant: Cisco Technology, Inc., Date of Mailing: Jun. 20, 2007, pp. 1-5.

* cited by examiner

SYSTEM AND METHOD FOR GENERATING SYMMETRICAL SPANNING TREES

RELATED APPLICATIONS

This Application is a continuation of U.S. patent application Ser. No. 11/228,162, now issued as U.S. Pat. No. 7,646,733, by Francois Tallet et al., filed on Sep. 16, 2005 and entitled "System and Method for Generating Symmetrical Spanning Trees", which is incorporated by reference herein in its entirety.

BACKGROUND OF THE INVENTION

1. Field of the Invention

The present invention relates generally to computer networks, and more specifically, to a method and apparatus for efficiently transmitting messages across the network.

2. Background Information

Many organizations, including businesses, governments and educational institutions, utilize computer networks so that employees and others may share and exchange is information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, or a wireless protocol, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE promulgated a standard (IEEE Std. 802.1D-1998™) that defines a spanning tree protocol to be executed by 802.1D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports is (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked is port may learn that it should be in the forwarding state (e.g., it is now the Root Port or a Designated Port).

Rapid Spanning Tree Protocol

Recently, the IEEE issued a new version of the 802.1D standard, known as IEEE Std. 802.1D-2004, that describes a rapid spanning tree protocol (RSTP) to be executed by otherwise 802.1D compatible devices. The RSTP similarly selects one bridge of a bridged network to be the root bridge and defines an active topology that provides complete connectivity among the LANs while severing any loops. Each individual port of each bridge is assigned a port role according to whether the port is to be part of the active topology. The port roles defined by the 802.1D-2004 standard include Root, Designated, Alternate and Backup. The bridge port offering the best, e.g., lowest cost, path to the root is assigned the Root Port Role. Each bridge port offering an alternative, e.g., higher cost, path to the root is assigned the Alternate Port Role. Each bridge port providing the lowest cost path from a given LAN is assigned the Designated Port Role, while all other ports coupled to the given LAN in loop-back fashion are assigned the Backup Port Role.

Those ports that have been assigned the Root Port and Designated Port Roles are placed in the forwarding state, while ports assigned the Alternate and Backup Roles are placed in a state. A port assigned the Root Port Role can be rapidly transitioned to the forwarding state provided that all of the ports assigned the Alternate Port Role are placed in the blocking state. Similarly, if a failure occurs on the port currently assigned the Root Port Role, a port assigned the Alternate Port Role can be reassigned to the Root Port Role and rapidly transitioned to the forwarding state, provided that the previous Root Port has been transitioned to the discarding or blocking state. A port assigned the Designated Port Role or a Backup Port that is to be reassigned to the Designated Port Role can be rapidly transitioned to the forwarding state, provided that the roles of the ports of the downstream bridge are consistent with this port being assigned the Designated Port Role. The RSTP provides an explicit handshake to be used by neighboring bridges to confirm that a new Designated Port can rapidly transition to the forwarding state.

Like the STP described in the 1998 version of the 802.1D specification standard, bridges running RSTP also exchange BPDUs in order to determine which roles to assign to the bridge's ports. The BPDUs are also utilized in the handshake employed to rapidly transition Designated Ports to the forwarding state.

Virtual Local Area Networks

A computer network may also be segmented into a series of logical networks. For example, U.S. Pat. No. 5,394,402, issued Feb. 28, 1995 to Ross (the "'402 patent"), discloses an arrangement for associating any port of a switch with any particular network segment. Specifically, according to the '402 patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition to the '402 patent, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-2003 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

Within the IEEE Std. 802.1Q-2003, the IEEE also included a specification standard for a Spanning Tree Protocol that is specifically designed for use with networks that support VLANs. The Multiple Spanning Tree Protocol (MSTP), which is described in the IEEE 802.1s supplement to IEEE Std. 802.1Q-2003, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-1998 compatible bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE Std. 802.1Q-1998 bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined within the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include both a settable priority component and a system ID extension. The system ID extension corresponds to the CIST or one of the MSTI IDs. The MSTP compatible bridges within a given Region will thus have a different bridge ID for the CIST and each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the is same MST Region, they do not propagate the actual VLAN to MSTI tables in their BPDUs. Instead, the MST BPDUs carry only a digest of the VLAN to MSTI table or mappings. The digest is generated by applying the well-know MD-5 algorithm to the VLAN to MSTI table. When a bridge receives an MST BPDU, it extracts the MST Configuration ID contained therein, including the digest, and compares it to its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

FIG. 1 is a highly schematic block diagram of an MST BPDU 100 in accordance with IEEE Std. 802.1Q-2003. The MST BPDU 100 includes a header 102 compatible with the Media Access Control (MAC) layer of the respective LAN standard, e.g., Ethernet. The header 102 comprises a destination address (DA) field, a source address (SA) field, a Destination Service Access Point (DSAP) field, and a Source Service Access Point (SSAP), among others. The DA field carries a unique bridge multicast destination address assigned to the spanning tree protocol, and the DSAP and SSAP fields carry standardized identifiers assigned to the spanning tree protocol. Appended to header 102 is a BPDU message area that includes an "outer" part 104 and an "inner" part 106. The outer part 104 has the same format as an RSTP BPDU message and is recognized as a valid RSTP BPDU message by bridges that do not implement MSTP. The "inner" part 106 is utilized by bridges executing MSTP to establish the IST and the MSTIs. The inner part 106 has a set of spanning tree parameters, e.g., spanning tree priority vectors, for the IST, and a set of parameters for each MSTI supported by the bridge sourcing the MSTP BPDU 100.

Outer part 104, also referred to as the CIST priority vector, has a plurality of fields, including a protocol identifier (ID) field 108, a protocol version ID field 110, a BPDU type field 112, a CIST flags field 114, a CIST root ID field 116, a CIST external path cost field 118, a CIST regional root ID field 120, a CIST port ID field 122, a message age field 124, a maximum (MAX) age field 126, a hello time field 128, and a forward delay field 130. The CIST root identifier field 116 contains the identifier of the bridge assumed to be the root of the Common and Internal Spanning Tree, which may be in the same MSTP Region as the bridge sourcing the BPDU message 100, in another MSTP Region or in part of the bridged network that is not running MSTP. The CIST external path cost field 118 contains a value representing the lowest cost from the bridge sourcing the BPDU 100 to the CIST root identified in field 116 without passing through any other bridge in the same region as the bridge that is sourcing the BPDU message 100.

Inner part 106, also referred to as an MSTI priority vector, similarly has a plurality of fields, including a version 1 length field 132, which is typically set to null, a version 3 length field 136, an MST configuration ID field 138, a CIST internal root path cost field 140, a CIST bridge ID field 144, and a CIST remaining hops field 150. Inner part 106 may further include one or more optional MSTI configuration messages 152, each of which constitutes another MSTI priority vector or M-record.

Because version 2 of the RSTP does not specify any additional fields beyond those already specified by version 1, the MST BPDU does not have a version 2 length field.

As mentioned above, the MST configuration ID field 138 is made up of three subfields: a configuration name sub-field 154, a revision level sub-field 156 and an MD-5 checksum sub-field 158. The configuration name sub-field 154 carries a variable length text string encoded within a fixed size, e.g., 32-octets. The revision level sub-field 156 carries an integer encoded within a fixed field of two octets. The MD-5 checksum sub-field 158 carries a 16-octet signature created by applying the MD-5 algorithm to the is bridge's VLAN to MSTI table, which contains 4096 consecutive two octet elements.

Each MSTI Configuration Message 152 consists of a plurality of fields including a MSTI flags field 160, a MSTI regional root ID field 162, a MSTI internal root path cost field 164, a MSTI bridge priority field 166, a MSTI port priority field 168, and a MSTI remaining hops field 170. MST bridges utilize the STP parameters contained in fields 140-150 of inner part 106 and in each MSTI configuration message 152 to compute an active topology for each MSTI configured in the respective region.

Although the STP prevents the formation of loops within a bridged network, it can result in the creation of less than ideal paths. FIG. 2 is a highly schematic illustration of a bridged network 200. Network 200 includes six bridges 202a-f, each having a plurality of ports (not shown). The bridges 202a-f are interconnected by network segments 204, such as shared media or point-to-point links. Suppose that bridge 202a is elected the root of the network 200. Execution of the STP will cause bridge 202b to block one of its ports to prevent the formation of a loop in network 200. Suppose bridge 202b determines that its port coupled to bridge 202f is to be blocked as indicated by the "X" on FIG. 2. Execution of the STP thus prevented the formation of a loop in network 200. The path utilized by data messages going from bridge 202b to bridge 202f, however, is far from optimal. In particular, data messages received at bridge 202b, e.g., from a Local Area Network (LAN) connected thereto (not shown) that are to be delivered to bridge 202f are routed through bridges 202e, 202d, 202a and 202c. Given that bridges 202b and 202f are neighbors, this roundabout path is obviously not ideal. Indeed, such a situation results in delays and wasted bandwidth.

SUMMARY OF THE INVENTION

Briefly, the invention relates to a system and method for creating multiple, symmetric spanning trees within a bridged network. The bridges cooperate to establish a plurality of spanning tree instances through the network. In the illustrative embodiment, the bridges form the same number of spanning trees as there are bridges, such that each is bridge is the root of one spanning tree instance. The bridges further cooperate to ensure that the paths defined by each spanning tree instance are symmetrical between every pair of bridges in the network. When a network message is received by the first bridge in the network, that bridge forwards the message on the spanning tree instance for which it is the root. In particular, the bridge may tag the message with a Virtual Local Area Network (VLAN) identifier (VID) that is associated with that spanning tree instance and forward the message into the network. The tagged message thus follows a more optimal path from the bridge at which it was initially received to its destination.

To establish the symmetrical spanning trees, the bridges generate, send and process novel Spanning Tree Protocol (STP) control messages. In accordance with the invention, the STP control message includes a new field, which is updated as the message is propagated across the network to reflect the path followed by the message. The bridges, moreover, utilize the value in this new path indication field as part of the spanning tree priority vectors used to compute the active topologies. Specifically, the bridges look to the value of the path record to select among two or more possible root ports, each of which has the same cost to the root. In an illustrative embodiment, the path record carries a value derived from the sum of Bridge Identifiers (IDs) corresponding to the bridges through which the STP control message has passed from the root bridge to the current bridge processing the STP control message. Because the sum of Bridge IDs along a given path between two bridges will be the same in both directions, utilization of the new path record in the selection of root ports ensures that the spanning trees between each pair of bridges will be symmetric.

BRIEF DESCRIPTION OF THE DRAWINGS

The invention description below refers to the accompanying drawings, of which.

DETAILED DESCRIPTION OF AN ILLUSTRATIVE EMBODIMENT

Figure 3:
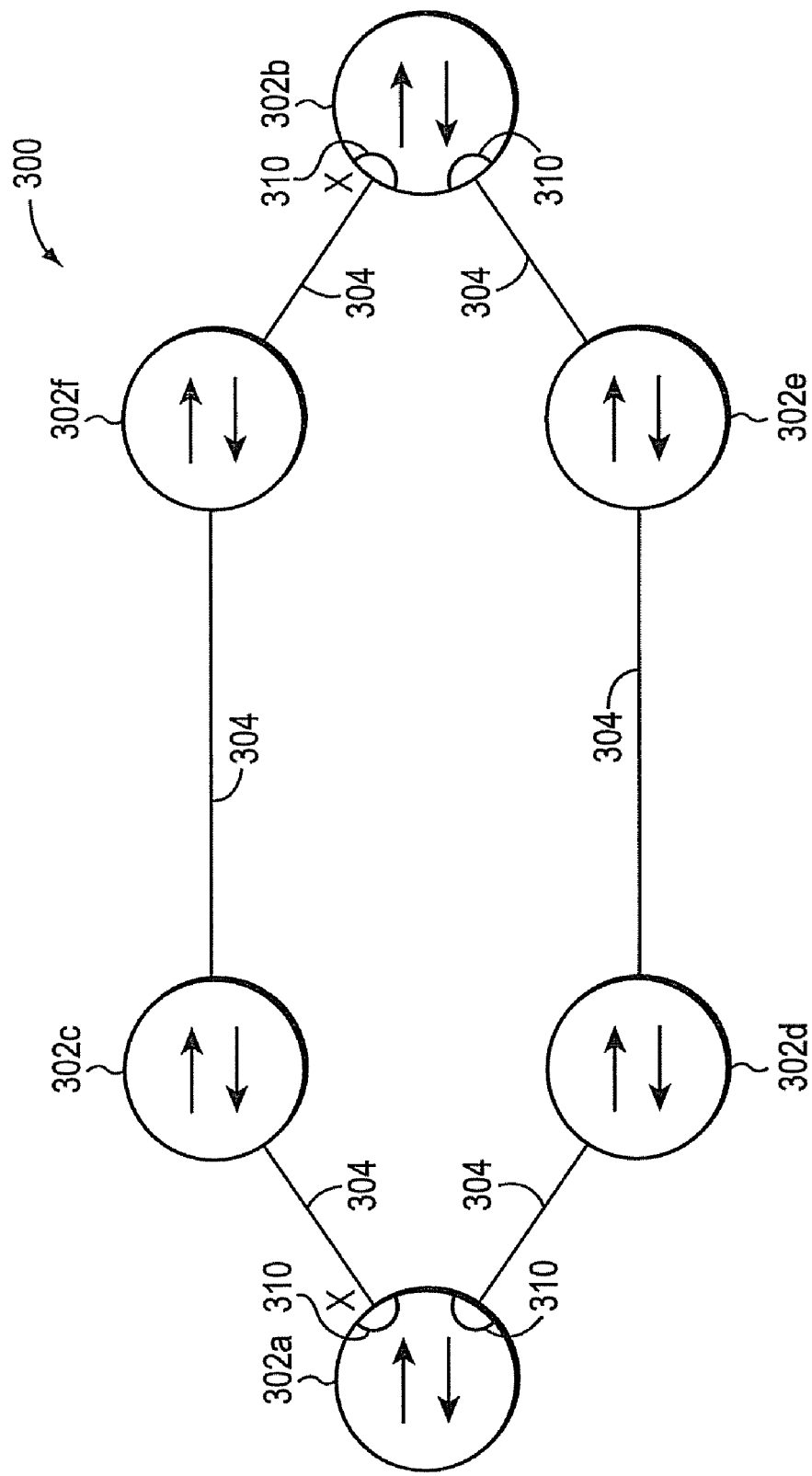
FIG. 3 is a highly schematic illustration of a bridged network in accordance with a preferred embodiment of the present invention.

FIG. 3 is a highly schematic illustration of a computer network 300 in accordance with the present invention. Network 300 includes a plurality of interconnected intermediate network devices 302a-f. Devices 302a-f are preferably bridges. Attached to the bridges 302a-f are network entities (not shown), such as local area networks (LANs) and/or end stations. The bridges 302a-f are interconnected by a plurality of segments 304, which may be shared media or point-to-point links.

Each bridge 302 has a plurality of ports 310 for receiving and forwarding messages across the network 300. The ports of each bridge 302, moreover, may be identified, e.g., by port numbers, such a Port 0 (P0), Port 1 (P1), Port 2 (P2), etc., so that the entities that can be reached by a respective bridge can be associated with the particular port used to reach them. Bridge ports that are coupled directly to end stations or LANs to which no other bridge is coupled are referred to as "access ports". Bridge ports 310 that connect to another intermediate network device, e.g., to a neighboring bridge, are referred to as "trunk ports".

It should be understood that the network 300 of FIG. 3 is meant for illustrative purposes only, and that the present invention will operate with other networks having is possibly far more complex topologies.

As shown, network 300 includes a loop. Execution of a spanning tree protocol, such as the Spanning Tree Protocol defined in IEEE Std. 802.1D-2003, prevents loops by defining a loop-free topology (i.e., an active topology) in the bridged network 300.

Furthermore, execution of the Rapid Spanning Tree Protocol (RSTP) or the Multiple Spanning Tree Protocol (MSTP), as defined at IEEE Std. 802.1Q-2003 Edition, will allow the ports 310 of the switches 302 that are part of the active topology to transition rapidly to a forwarding state so that network messages can be forwarded with minimal disruption and/or delay. However, as set forth above, in some situations, the current implementation of the RSTP and MSTP may result in certain inefficiencies. To avoid these inefficiencies, among other reasons, the bridges 302 of network 300 are configured to establish a plurality of symmetrical spanning trees within network 300.

Figure 4:
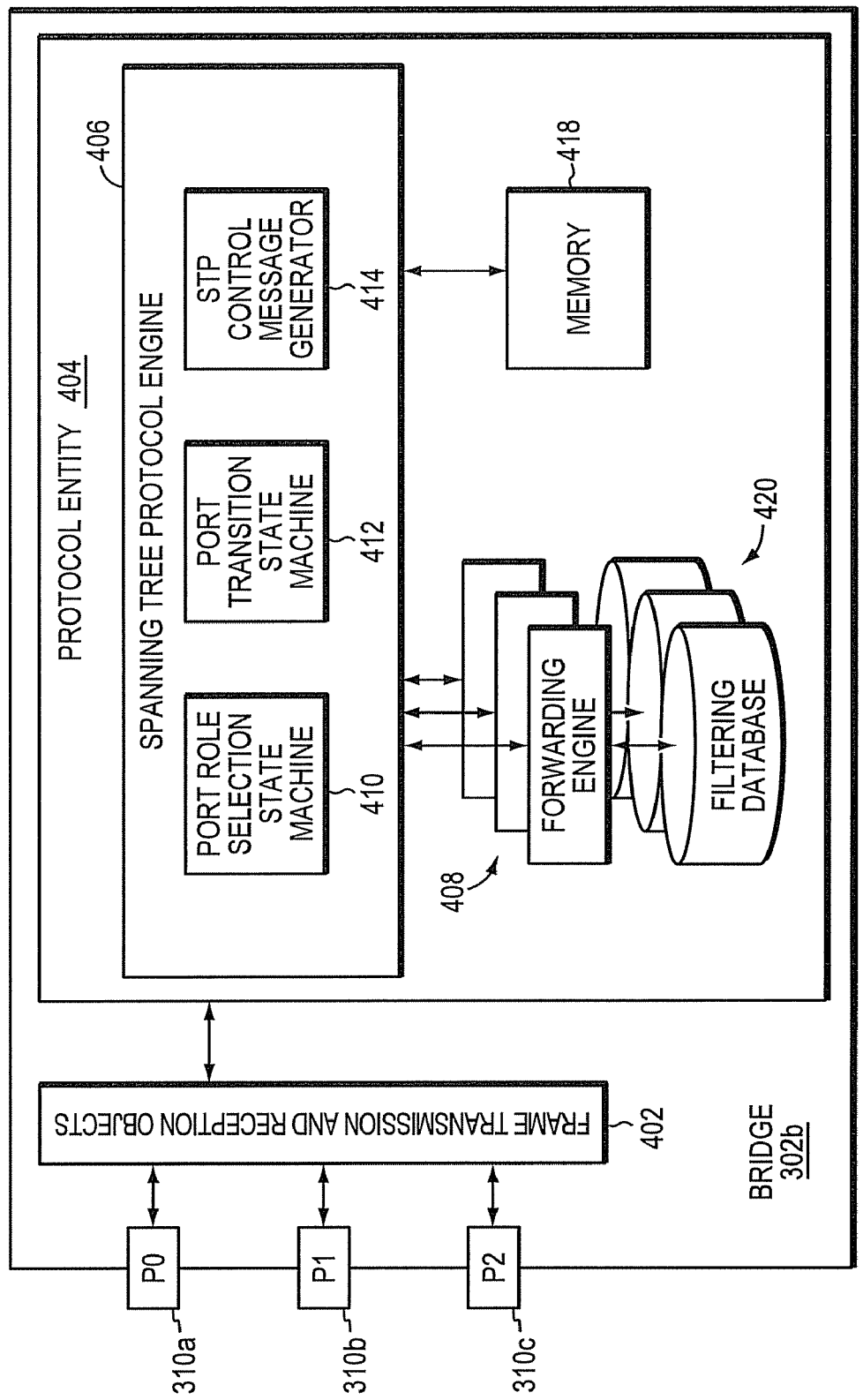
FIGS. 4 and 5 are partial block diagrams of an intermediate network device in accordance with a preferred embodiment of the present invention.

FIG. 4 is a partial block diagram of bridge 302b. As indicated above, it has a plurality of ports 310a-c each of which is preferably identified by a number (e.g., P0-P2). One or more frame transmission and reception objects, designated generally 402, are associated with the ports 310a-c such that network messages, including data frames, received at a given port, e.g., P1, may be captured, and frames to be transmitted by bridge 302b may be delivered to a given port, e.g., P2. Frame reception and transmission objects 402 are preferably message storage structures, such as priority queues.

Bridge 302b further includes at least one protocol entity 404 that is in communicating relationship with the frame transmission and reception objects 402, and that comprises a plurality of components. In particular, the protocol entity 404 includes at least one spanning tree protocol (STP) engine 406 and one or more forwarding engines 408. The STP engine 406 preferably comprises a plurality of subcomponents, including a port role selection state machine 410, a port transition state machine 412, and a STP control message generator 414. The STP engine 406 basically operates in compliance with the IEEE 802.1S Multiple Spanning Tree Protocol (MSTP) supplement to the IEEE Std. 802.1Q-2003, which is hereby incorporated by reference in its entirety, as extended by the novel improvement described herein. The STP engine 406 includes or is in communicating relationship with a memory 418, which may be a volatile and/or non-volatile random access memory (RAM) or some other memory device. Memory 418 is preferably organized to include a plurality of records or cells (not shown) for storing spanning tree related information or parameters, such as the bridge's numeric bridge identifier (ID), the assigned path cost for each port 310a-c, the current or "best" spanning tree information for each port P0-P2, etc.

The one or more forwarding engines 408 are preferably coupled to one or more filtering databases 420 that stores address information corresponding to the entities of network 300 (FIG. 3). Each filtering database preferably has a plurality of records (not shown) each containing a plurality of cells, including a destination address cell, a destination port cell and a corresponding timer cell. Each record in the filtering databases 420 preferably corresponds to a particular network entity.

The forwarding engines 408 are configured to switch or bridge messages, such as packets and/or frames, from a source port 310 to one or more destinations ports 310 depending on information contained in the appropriate forwarding database 420, and also depending on the spanning tree port states of the respective ports 310, as managed by STP engine 406. The forwarding engines 408 are also in communicating relationship with the STP engine 406, and may relay STP control messages, such as MSTP bridge protocol data unit (BPDU) messages, received at ports 310 thereto.

Figure 5:
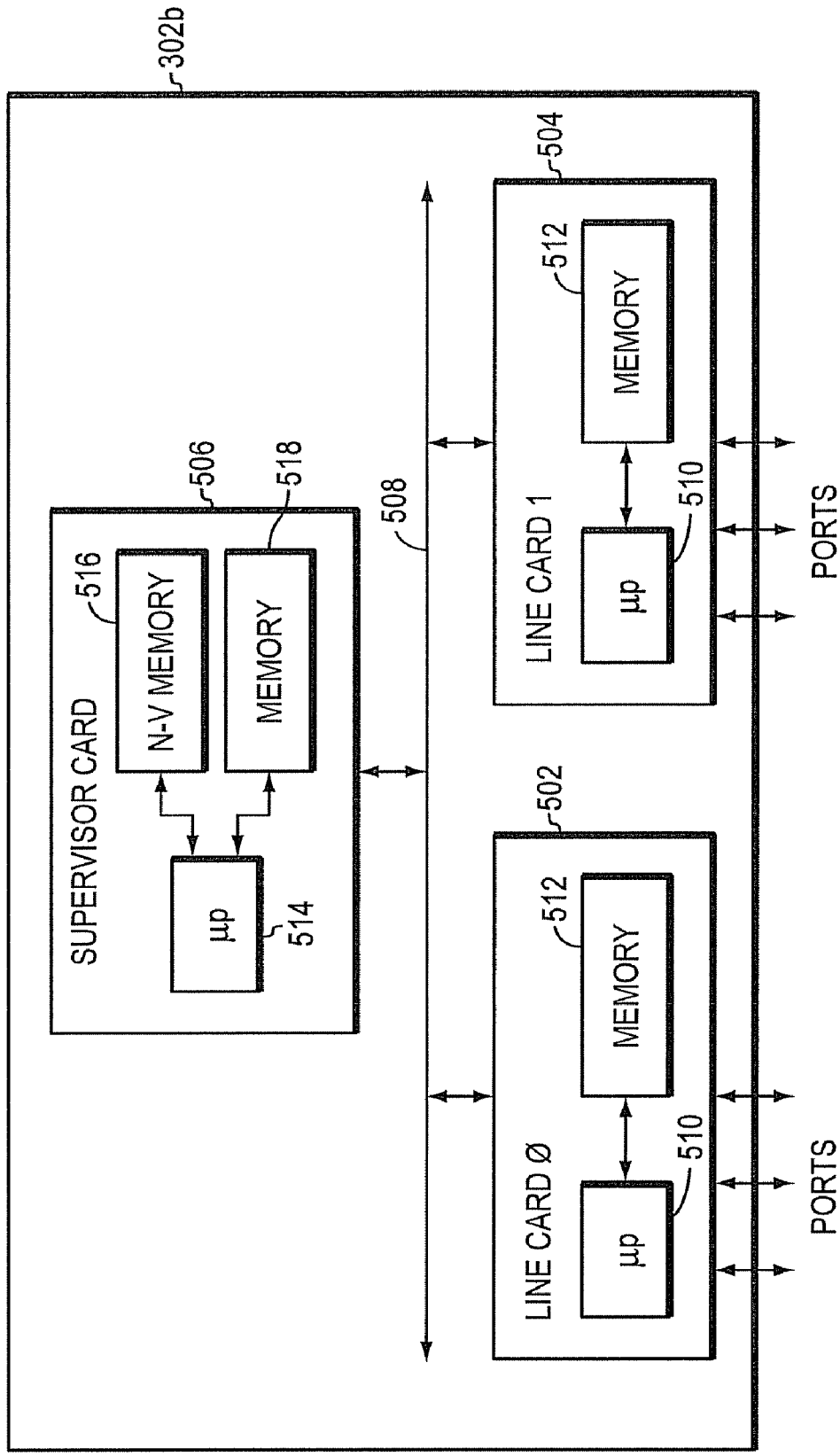

In the illustrated embodiment, bridge 302b includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 5 is another highly schematic, partial block diagram of bridge 302b illustrating such components. As shown in FIG. 5, bridge 302b includes a plurality of line cards 502 and 504, and a supervisor card 506. Cards 502, 504 and 506 are in communicating relationship with each other through a communication bus 508. Each of the line cards 502 and 504 includes a microprocessor (µP) 510 and at least one memory 512. The supervisor card 506 also includes a µP 514, as well as both a non-volatile (N-V) memory 516 and a volatile memory 518, e.g., RAM.

Referring again to FIG. 4, it will be understood by those skilled in the art that STP engine 406 and forwarding engines 408 may each comprise registers and combinational logic configured and arranged to produce sequential logic circuits. In the illustrated embodiment, engines 406 and 408 are preferably software modules or libraries containing program instructions pertaining to the methods described herein and executable by one or more processing elements, such as the microprocessors 510 and/or 514 (FIG. 5), of bridge 302b. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available series of switches from Cisco Systems, Inc. of San Jose, Calif., such as the Catalyst 4000 and 6000.

As set forth herein, bridges 302 of network 300 are configured to create a plurality of spanning tree instances through network 300. In the illustrative embodiment, they create one spanning tree instance per bridge where each bridge is the root of one spanning tree instance. Each bridge 302 is also configured to forward messages that it received on one of its access ports along the spanning tree instance for which the bridge is the root. In this way, messages traversing network 300 follow more efficient paths.

Because a bridge typically learns which port to use in order to reach another device within a network based upon the bridge port at which frames from that device have been received by it, the active topology defined by each pair of bridges needs to be symmetric. Otherwise a loss of communication might result. Accordingly, the bridges 302 are further configured such that the two spanning tree instances associated with each pair of bridges is symmetric. A pair of spanning tree instances are considered symmetric when the route followed by a message sourced by either of the two bridges is the same, i.e., the two messages pass through the same set of intermediary bridges but in the reverse order from each other.

To ensure that each pair of spanning tree instances is symmetric, the bridges 302 of network 300 are configured, first such that the path cost for a given segment is the same for all bridges coupled to that segment, and second to exchange and process novel STP control messages. In one embodiment, a network administrator manually configures the bridges 302 of network 300 such that all bridges coupled to a given network segment have the same path cost assigned to that segment. Those skilled in the art will understand that other techniques besides manual configuration may be used. For example, an information distribution protocol may be used to convey path costs.

Figure 1:
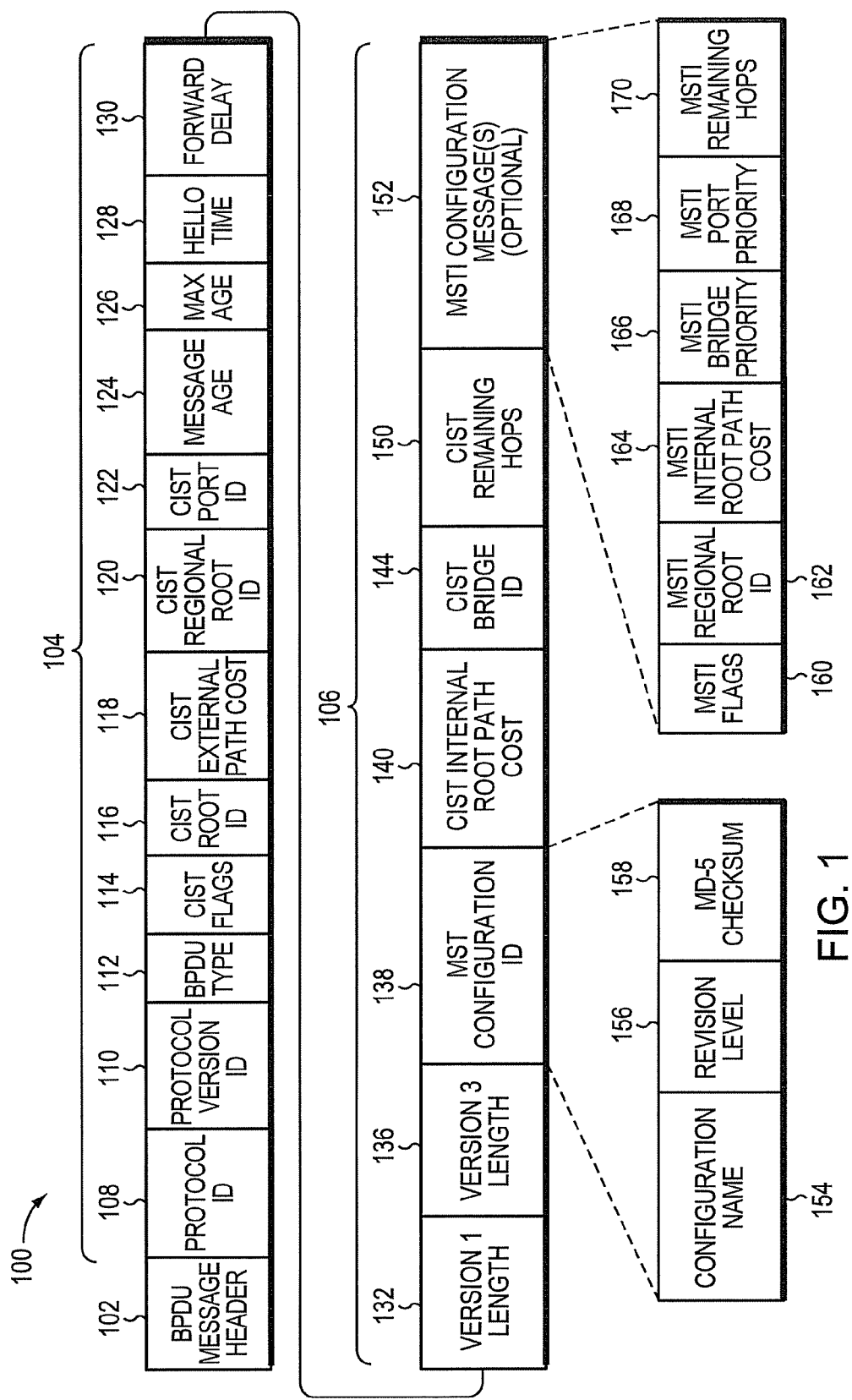
FIG. 1, previously discussed, is a schematic block diagram of a conventional configuration bridge protocol data unit in accordance with the Multiple Spanning Tree Protocol.
Figure 2:
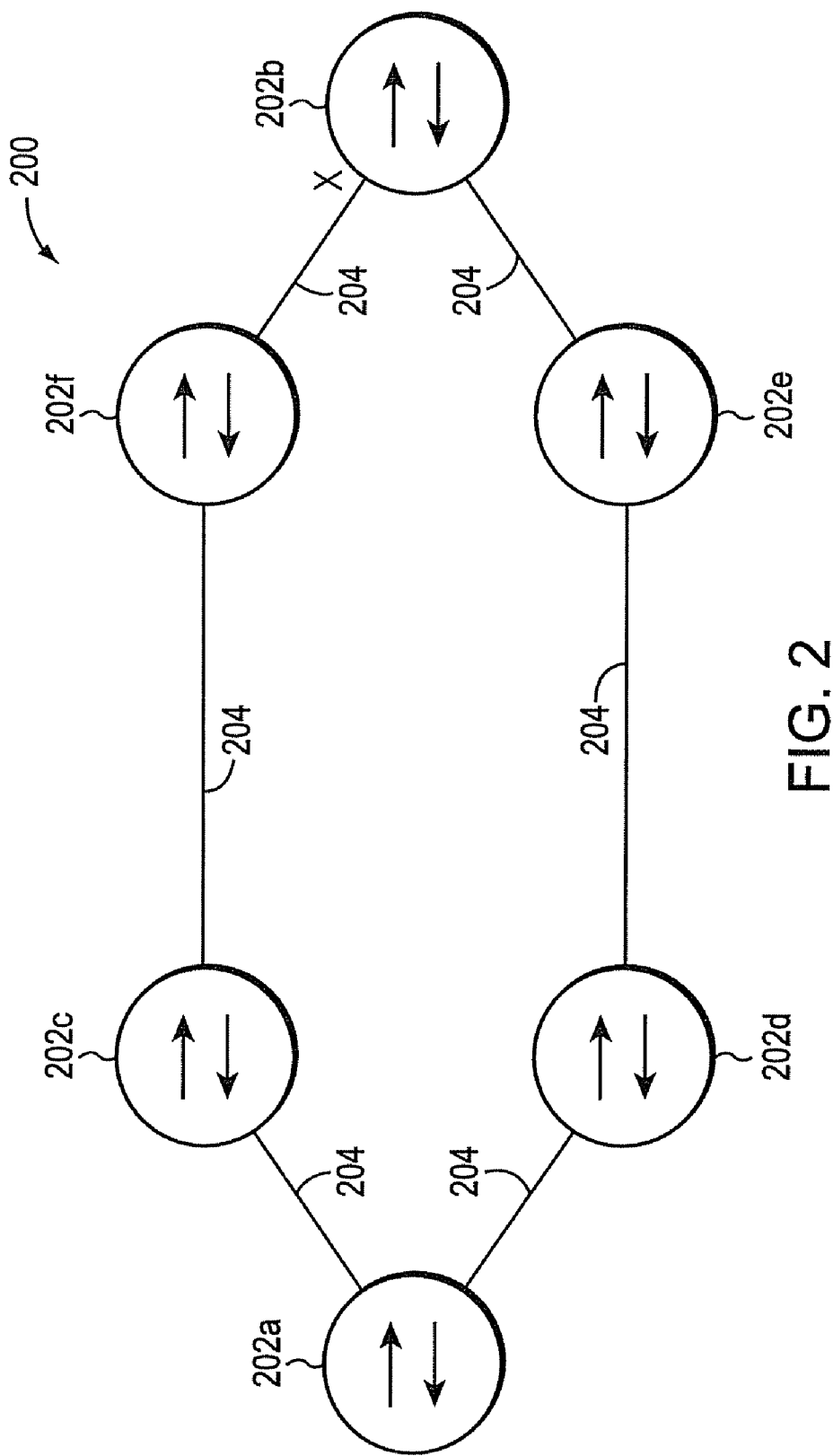
FIG. 2, previously discussed, is a highly schematic illustration of a prior art bridged network.

A conventional MSTP BPDU message 100 (FIG. 1) includes a plurality of MSTI Configuration messages 152; one for each spanning tree instance for which the MSTP BPDU 100 is carrying information. In accordance with the present invention, the novel STP control message is formed by modifying each MSTI Configuration message to carry path-tracking or recording information. As the STP control message is propagated across the network 300, it is updated to reflect each bridge through which it is being propagated.

Figure 6:
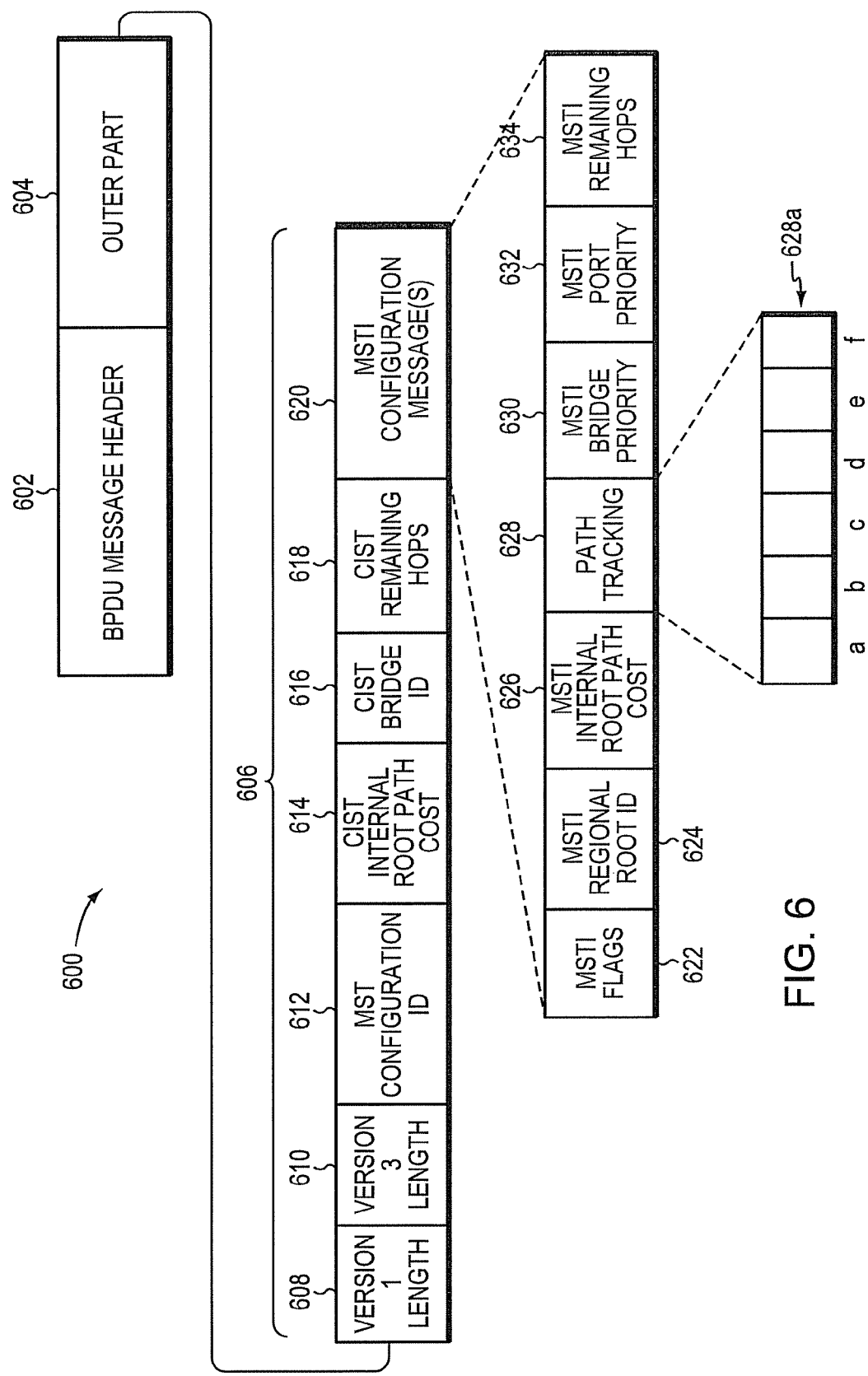
FIG. 6 is a highly schematic block diagram of a spanning tree protocol control message in accordance with a preferred embodiment of the present invention.

FIG. 6 is a highly schematic illustration of a preferred format of a STP control message 600. The STP control message 600 includes a header 602 that is preferably compatible with the Media Access Control (MAC) layer of the respective LAN standard, e.g., Ethernet, and corresponds to the header 102 (FIG. 1) of a MSTP BPDU 100. Appended to the header 602 is an "outer" part 604, which has the same format as outer part 104 (FIG. 1) of the MSTP BPDU 100. That is, outer part 604 corresponds to an RSTP BPDU message and is recognized as a valid RSTP BPDU message by bridges that do not implement MSTP or the Spanning Tree Routing extension to MSTP. The STP control message 600 further includes an "inner" part 606 that is utilized by bridges 302 to establish the IST and the symmetrical MSTIs. Inner part 606 preferably includes a version 1 length field 608, a version 3 length field 610, a MST Configuration ID field 612, a CIST Internal Root Path Cost field 614, a CIST Bridge ID field 616, a CIST Remaining Hops field 618, and a plurality of MSTI Configuration Messages 620.

As further shown in FIG. 6, each MSTI Configuration Message 620 preferably includes a MSTI flags field 622, a MSTI Regional Root ID field 624, a MSTI Internal Root Path Cost field 626, a Path Tracking field 628, a MSTI Bridge Priority field 630, a MSTI Port Priority field 632, and a MSTI Remaining Hops field 634.

With reference to FIG. 3, bridge 302a generates a STP control message 600 message for transmission from its ports. Within the STP control message 600, bridge 302a inserts a MSTI Configuration message 620 for the spanning tree instance for which bridge 302a is the root. Bridge 302a loads the MSTI flags field 622 of this MSTI Configuration message 620 as specified by IEEE 802.1Q. Since this MSTI Configuration message 620 corresponds to the spanning tree instance for which bridge 302a is the root, it enters its own Bridge ID value in the MSTI regional root ID field 624, and sets the MSTI internal root path cost field 626 to null or zero. In accordance with the present invention, bridge 302*a* also sets the path tracking field 628 to null or zero, since this MSTI Configuration message 600 is being generated by bridge 302*a*, and has yet to pass through any bridges 302. Fields 630-634 are preferably loaded in accordance with the conventional MSTP. Bridge 302*a* then transmits the STP control message 600 from its ports 310.

One or more of the STP control messages from bridge 302*a* is received by bridge 302*c* and by bridge 302*d*. Bridge 302*c* replaces the current value contained in the root path cost field 626 with the sum of the current value and the cost of the path between it and bridge 302*a*. Bridge 302*c* also updates the value of path tracking field 628 to indicate that this STP control message 600 has been propagated through bridge 302*c*. In one embodiment, bridge 302*c* updates the path-tracking field 628 as follows. First, bridge 302*c* applies a hash function to its Bridge ID value so as to generate a hashed Bridge ID value. A Bridge ID is typically 64-bits long. The first 4-bits are a settable priority component, the next 12-bits specify the spanning tree instance, and the last 48-bits is the bridge's globally unique MAC address, e.g., the MAC address for port P0. The hash function may be applied to the entire 64-bit Bridge ID. Alternatively, it may be applied to just a portion of the Bridge ID, such as the 48-bit MAC address or some other field or combination of fields.

In a preferred embodiment, the hash function produces a value that is less than 64-bits. Nonetheless, in an alternative embodiment the hash function may produce an output that is greater than 64-bits.

After generating the hashed Bridge ID value, bridge 302*c* replaces the current value of the path-tracking field 628 with the sum of the hashed value and the path tracking field's current value. Bridge 302*c* preferably modifies the values of fields 630-634 as specified by IEEE Std. 802.1Q-2003. Bridge 302*c* then propagates the as-modified STP control message 600 from its ports 310.

Those skilled in the art will understand that any number of well-known hash functions may be employed, such as Cyclic Redundancy Check (CRC), Secure Hash Algorithm (SHA), Message Digest Algorithm 4 or 5 (MD4 or MD5), Race Integrity Primitives Evaluation Message Digest (RIPEMD).

Bridge 302*d* similarly modifies the STP control message 600 received from bridge 302*a* before propagating it from its own ports 310. Bridge 302*d*, however, updates the path tracking field by hashing its Bridge ID and then adding this hashed Bridge ID value to the current path tracking value in order to create the new path tracking value for field 628. This process is repeated by bridges 302*e* and 302*f*, which update the path tracking field 628 of the STP control messages 600 received by them. In particular, bridge 302*e* updates the path-tracking field 628 by hashing its Bridge ID and adding the is hashed value to the current path tracking value. Bridge 302*f* similarly updates the path-tracking field 628 by hashing its Bridge ID and adding the hashed value to the current path tracking value.

Bridge 302*b* receives two MST Configuration messages 620 for the spanning tree instance for which bridge 302*a* is the root. The first MST Configuration message 620 is received from bridge 302*e*, and has a value in its path tracking field 628 that reflects that this MST Configuration message 620 was propagated through bridges 302*d* and 302*e*. The second MST Configuration message 620 is received from bridge 302*f*. It carries a value in its path tracking field 628 that reflects that it was propagated through bridges 302*c* and 302*f*. Bridge 302*b* utilizes the values from these two MST Configuration mesasages to select its root port for the spanning tree instance for which bridge 302*a* is the root. First, bridge 302*b* determines whether one of the received MST Configuration messages 620 specifies a lower cost path to the root, i.e., to bridge 302*a*, than the other. If so, bridge 302*b* selects as its root port, the port providing the lowest cost path to the root, i.e., to bridge 302*a*. Suppose the path costs specified by both MSTI Configuration messages 620 are the same. Under the conventional MSTP operation, bridge 302*b* would then look to the Bridge IDs of the bridges that sourced the two MSTI Configuration messages as carried in field 610 to elect its root port, i.e., the Bridge IDs of bridges 302*e* and 302*f*.

Instead of looking to the source Bridge IDs, however, the STP engine 406 of bridge 302*b* is configured to utilize the values of the path-tracking field 628 to elect its root port. That is, with the present invention, in situations where the root path costs for two or more ports are the same, the STP engine 406 elects, as its root port, the port on which the MSTI Configuration message 620 with the lowest path tracking value was received. Suppose that the MSTI Configuration message 620 from bridge 302*e* has a lower path tracking value than the path tracking value carried by the MST configuration message 620 from bridge 302*f*. Bridge 302*b* responds by electing its port coupled to bridge 302*e* as the root port for the spanning tree instance for which bridge 302*a* is the root. In response, the port role selection state machine 410 assigns the port to the Root Port Role, and the port transition state machine transitions the port to the forwarding state. The port coupled to bridge 302*f* is assigned to the Alternate Port Role, and is transitioned to the blocking state, as indicated by the "X.

Those skilled in the art will understand that, rather than using lowest path tracking value, the STP engines of bridges 302*a-f*, could alternatively be configured to use the highest path tracking values for electing root ports. Similarly, those skilled in the art will understand that a different function, other than summing, may be used in updating the path-tracking record field.

Bridge 302*a* similarly receives two MSTI Configuration messages 620 originally generated by bridge 302*b* for the spanning tree instance for which bridge 302*b* is the root. The first such MSTI Configuration message carries a value in its path tracking field 628 that indicates it was propagated through bridges 302*f* and 302*c*, while the second MSTI Configuration message 620 carries a value a value in its path tracking field 628 that indicates it was propagated through bridges 302*e* and 302*d*. As was the case with bridge 302*b*, bridge 302*a* also relies on the values contained in these two path-tracking fields when electing its root port for the spanning tree instance for which bridge 302*b* is the root. Bridge 302*a* looks to the values carried by the path tracking fields 628, because the root path costs for its two ports 310 leading to bridge 302*b* are the same.

Significantly, the value contained in the path tracking field 628 of the MSTI Configuration message 620 received from bridge 302*d* is lower than the path tracking field 628 of the MSTI Configuration message 620 received from bridge 302*c*. This is true because the path tracking value is the same regardless of the direction taken by the respective STP control message. That is, (hash of Bridge ID for bridge 302*d*)+(hash of Bridge ID for bridge 302*e*) equals (hash of Bridge ID for bridge 302*e*)+(hash of Bridge ID for bridge 302*d*). Similarly, (hash of Bridge ID for bridge 302*c*)+(hash of Bridge ID for bridge 302*f*) equals (hash of Bridge ID for bridge 302*f*)+(hash of Bridge ID for bridge 302*c*). Accordingly, bridge 302*a* elects, as its root port for the spanning tree instance for is which bridge 302*b* is the root, its port coupled to bridge 302*d*. This port is thus assigned to the Root Port Role, and transitioned to the forwarding state. The port coupled to bridge 302c is assigned to the Alternate Port Role, and transitioned to the blocking state, as indicated by the "X".

As shown, utilization of the path-tracking feature of the present invention ensures that the spanning trees rooted at any pair of bridges 302 of network 300 will be symmetrical.

In the preferred embodiment, network 300 is further configured such that each spanning tree instance is assigned a corresponding VLAN ID (VID). When a bridge 302 receives a message on one of its access ports, it preferably tags the message with the VID assigned to the spanning tree instance for which the bridge is the root. In this way, the message is routed along the spanning tree instance for which the bridge that initially received the message is the root. Those skilled in the art will understand that the VLAN configuration may be performed manually by a network administrator.

It should be understood that, rather than applying a hash function, the bridges 302 could alternatively apply some function, such as summing, to their full Bridge ID values in order to update the path-tracking field 628. It should also be understood that a value other than Bridge IDs could be chosen as the basis of the path record. Furthermore, other approaches besides hash functions may be employed. Such other approaches preferably take a value associated with each bridge, which may be its Bridge ID as described here or some other value, and use that selected value as a key to generate a random number. In a preferred embodiment, the selected bridge value, and the applied function(s) are chosen so as to minimize, if not eliminate, the chance of collisions, i.e., the same path-tracking record value being produced even though two different paths are traversed.

In a preferred embodiment, the path-tracking field is configured to have a bit for each bridge 302 of network 300. Such a configuration is shown in the alternative path-tracking field 628a of FIG. 6, in which field 628a includes six bits; one for each bridge 302. In this embodiment, before transmitting a MSTI Configuration message 620, a root bridge, e.g., bridge 302a, asserts, e.g., sets to "1", the bit of field 628a that is associated with the root bridge, and de-asserts, e.g., sets to zero or null, all other bits of field 628a. As each downstream bridge, e.g., bridge 302d, receives the STP control message 600 carrying path tracking field 628a, it asserts, e.g., sets to "1", the bit of field 628a that is assigned to it. Thus, for a path tracking field originally sourced by bridge 302a and propagating through bridges 302d and 302e, the bits of the path tracking field 628a corresponding to these three bridges will be asserted, while the other bit positions will all be de-asserted. Again, when the root path costs for two or more ports are the same, a bridge 302 elects as its root port, the port on which the lower (or, alternatively the higher) path tracking value was received.

The STP engine 406 of each bridge 302 may be configured through network administrator action with information indicating which bit of the path-tracking field 628a is assigned to that bridge 302. Alternatively, this information could be provided to the bridges 302 through execution of an information distribution protocol.

Such a configuration of the path-tracking field 628a avoids situations in which the hashed sum of two different groups of Bridge IDs nonetheless comes to the same value, thereby ensuring deterministic behavior.

The present invention can also be used with other techniques for establishing symmetrical spanning trees. For example, U.S. patent application Ser. No. 11/182,564, filed Jul. 14, 2005 entitled Methods and Devices for Improving the Multiple Spanning Tree Protocol, commonly owned with the present application, and which is hereby incorporated by reference in its entirety, discloses a technique for creating symmetrical spanning trees using a Reflection Vector.

The Reflection Vector includes a separate bit for each spanning tree instance being defined in the network. Each MSTI Configuration message, moreover, is configured to carry a corresponding Reflection Vector. When a root bridge generates the MSTI Configuration message for the spanning tree instance for which it is the root, it initially asserts all of the bits of the Reflection Vector, e.g., it sets them all to "1". The root bridge then checks to see if the given port from which the Reflection Vector is being sent is not the root port for any of the spanning tree instances. If the given port is not the root port for a spanning tree instance, the bridge deasserts the bit position of the Reflection Vector corresponding to the spanning tree instance. Downstream bridges similarly deassert those bit positions of the Reflection Vector corresponding to spanning tree instances for which the port from which the Reflection Vector is being sent is not the root port. For those spanning tree instances for which the given port is the root port, then the corresponding bits of the Reflection Vector are left "as is", i.e., as received by the downstream bridge.

In a preferred embodiment, the path tracking feature of the present invention is combined with the Reflection Vector of the incorporated patent application. That is, the MST Configuration messages are modified to convey both path-tracking fields and Reflection Vectors. In a further embodiment, the Reflection Vector is modified to include only the bits for those spanning tree instances that are inferior to the spanning tree instance associated with the Reflection Vector. In particular, a unique number can be attributed to each spanning tree instance. When a given bridge builds a reflection vector for the spanning tree instance for which it is the root, it need only include the bits for those spanning tree instances whose unique value is less than the spanning tree instance for which it is the root.

By incorporating the path tracking feature of the present invention with the Reflection Vector, a Reflection Vector is able to converge in a single pass across the network.

The foregoing description has been directed to specific embodiments of this invention. It will be apparent, however, that other variations and modifications may be made to the described embodiments, with the attainment of some or all of their advantages. For example, rather than forming a separate spanning tree instance for each bridge is in the network, the bridges may be organized into groups and symmetric spanning trees established for each pair of groups. Therefore, it is an object of the appended claims to cover all such variations and modifications as come within the true spirit and scope of the invention.

What is claimed is:

1. A method comprising:
receiving, by a first port of a network device, a first spanning tree protocol (STP) control message including a first path-tracking field corresponding to a given spanning tree instance in a network, the first path-tracking field including a value based on one or more other network devices that have propagated the first STP control message;
receiving, by a second port of the network device, a second STP control message including a second path-tracking field corresponding to the given spanning tree instance, the second path-tracking field including a value based on one or more other network devices that have propagated the second STP control message; and
utilizing the values from the first path-tracking field of the first STP control message and the second path-tracking field of the second STP control message to select a root port for the given spanning tree instance from among the first port and the second port of the network device, wherein the first port and second port have a same cost for the given spanning tree instance.

2. The method of claim 1, wherein the given spanning tree instance is rooted at a root device, and the same cost is for a path to the root device of the given spanning tree instance.

3. The method of claim 1, wherein the values from the first path-tracking field of the first STP control message and the second path-tracking field of the second STP control message are each based on a-hash of identifier (ID) values of the one or more other network devices that have propagated the respective STP control message.

4. The method of claim 3, wherein the ID values are bridge ID values.

5. The method of claim 1, wherein the first STP control message and the second STP control message each include one or more Multiple Spanning Tree (MST) configuration messages, each MST configuration message corresponding to a different spanning tree instance of a plurality of spanning tree instances in the network and having a respective path-tracking field.

6. The method of claim 1, wherein the utilizing further comprises:
selecting the root port for the given spanning tree instance as a port associated with a lower value of the values from the first path-tracking field of the first STP control message and the second path-tracking field of the second STP control message.

7. The method of claim 1, wherein the utilizing further comprises:
selecting the root port for the given spanning tree instance as a port associated with a higher value of the values from the first path-tracking field of the first STP control message and the second path-tracking field of the second STP control message.

8. The method of claim 1, comprising:
establishing a plurality of spanning tree instances, wherein each network device in the network is a root of at least one respective spanning tree instance, and the given spanning tree instance is an instance of the plurality of spanning tree instances.

9. The method of claim 1, wherein the first path-tracking field and the second path-tracking field each includes bits corresponding to network devices of the network and the values from the first path-tracking field of the first STP control message and the second path-tracking field of the second STP control message are each based on assertion of bits corresponding to the network devices of the network that have propagated the respective STP control message.

10. The method of claim 1, further comprising:
assigning a virtual local area network (VLAN) identifier (VID) to the given spanning tree instance; and
tagging a message received by the root of the given spanning tree instance with the VID.

11. A network device comprising:
a first port coupled to another network device, the first port configured to receive a first spanning tree protocol (STP) control message including a first path-tracking field corresponding to a given spanning tree instance of a plurality of spanning tree instances, the first path-tracking field including a value based on identifier (ID) values of one or more network devices that have propagated the first STP control message;
a second port coupled to another network device, the second port configured to receive a second STP control message including a second path-tracking field corresponding to the given spanning tree instance, the second path-tracking field including a value based on identifier (ID) values of one or more network devices that have propagated the second STP control message; and
a STP engine configured to cooperate in the creation of the plurality of spanning tree instances, the STP engine to utilize the values from the first path-tracking field of the first STP control message and the second path-tracking field of the second STP control message to select a root port for the given spanning tree instance from among the first port and the second port.

12. The network device of claim 11, wherein the first port and second port have a same cost for a path to a root device of the given spanning tree instance.

13. The network device of claim 11, wherein the values from the first path-tracking field of the first STP control message and the second path-tracking field of the second STP control message are each based on a hash of the ID values of the one or more network devices that have propagated the respective STP control message.

14. The network device of claim 11, wherein the ID values are bridge ID values.

15. The network device of claim 11, wherein the first STP control message and the second STP control message each include one or more Multiple Spanning Tree (MST) configuration messages, each MST configuration message corresponding to a different spanning tree instance of the plurality of spanning tree instances in the network and having a respective path-tracking field.

16. The network device of claim 11, wherein the STP engine is further configured to select the root port for the given spanning tree instance as a port associated with a higher value of the values from the first path-tracking field of the first STP control message and the second path-tracking field of the second STP control message.

17. The network device of claim 11, wherein the first path-tracking field and the second path-tracking field each includes bits corresponding to network devices of the network and the values from the first path-tracking field of the first STP control message and the second path-tracking field of the second STP control message are each based on assertion of bits corresponding to the network devices of the network that have propagated the respective STP control message.

18. The method of claim 11, wherein the STP engine is further configured to cooperate in the creation of the plurality of spanning tree instances to have each spanning tree instance rooted at a different network device in the network.

19. A network device comprising:
a first port coupled to another network device, the first port configured to receive a first spanning tree protocol (STP) control message including a first path-tracking field corresponding to a given spanning tree instance of a plurality of spanning tree instances, the first path-tracking field including a value based on one or more network devices that have propagated the first STP control message;
a second port coupled to another network device the second port configured to receive a second STP control message including a second path-tracking field corresponding to the given spanning tree instance, the second path-tracking field including a value based on one or more network devices that have propagated the second STP control message; and
means for utilizing the values from the first path-tracking field of the first STP control message and the second path-tracking field of the second STP control message to select a root port for the given spanning tree instance from among the first port and the second port of the network device, wherein the first port and second port have a same cost for the given spanning tree instance.

20. The network device of claim 19, wherein the first STP control message and the second STP control message each include one or more Multiple Spanning Tree (MST) configuration messages, each MST configuration message corresponding to a different spanning tree instance of the plurality of spanning tree instances in the network and having a respective path-tracking field.

* * * * *

UNITED STATES PATENT AND TRADEMARK OFFICE
CERTIFICATE OF CORRECTION

PATENT NO. : 8,175,009 B2
APPLICATION NO. : 12/633755
DATED : May 8, 2012
INVENTOR(S) : Francois Edouard Tallet et al.

Page 1 of 1

It is certified that error appears in the above-identified patent and that said Letters Patent is hereby corrected as shown below:

Col. 1, line 23 should read: "that employees and others may share and exchange ~~is~~ infor-"

Col. 2, line 24 should read: "non-Designated Ports ~~is~~ (its "Root Port") which gives the"

Col. 2, line 65 should read: "previously blocked ~~is~~ port may learn that it should be in the"

Col. 5, line 21 should read: "not they are in the ~~is~~ same MST Region, they do not propagate"

Col. 6, line 30 should read: "applying the MD-5 algorithm to the ~~is~~ bridge's VLAN to"

Col. 7, line 3-4 should read: "spanning trees as there are bridges, such that each ~~is~~ bridge is the"

Col. 8, line 18 should read: "invention will operate with other networks having ~~is~~ possibly"

Col. 10, line 44 should read: "~~is~~ implement MSTP or the Spanning Tree Routing extension"

Col. 11, line 53 should read: "filed 628 by hashing its Bridge ID and adding the ~~is~~ hashed"

Col. 11, line 67 - Col. 12, line 1 should read: "utilizes the values from these two MST Configuration ~~mesas sages~~ messages to select its root port for the spanning tree instance for"

Col. 12, line 65 should read: "elects, as its root port for the spanning tree instance for ~~is~~"

Col. 14, line 44 should read: "spanning tree instance for each bridge ~~is~~ in the network, the"

Col. 15, line 11 should read: "are each based on ~~a hash~~ a hash of identifier (ID) values of the one or"

Signed and Sealed this
Third Day of July, 2012

David J. Kappos
*Director of the United States Patent and Trademark Office*